United States Patent [19]

Tadema

[11] 4,380,193

[45] Apr. 19, 1983

[54] DEVICE FOR PREPARING CHOCOLATE

[75] Inventor: Jan C. Tadema, Bergen, Netherlands

[73] Assignee: Wiener & Co. B.V., Amsterdam, Netherlands

[21] Appl. No.: 238,014

[22] Filed: Feb. 25, 1981

Related U.S. Application Data

[63] Continuation of Ser. No. 91,000, Nov. 5, 1979, abandoned.

[30] Foreign Application Priority Data

Nov. 24, 1978 [NL] Netherlands .......................... 7811567

[51] Int. Cl.³ .......................... A23G 1/04; A23G 1/10
[52] U.S. Cl. ......................................... 99/452; 99/460; 99/474; 99/487; 366/151; 366/182; 426/475; 426/486

[58] Field of Search ................. 99/474, 485, 516, 534, 99/452, 460, 487; 426/475, 486, 487, 518, 629; 241/33, 34; 366/151, 154, 159, 160, 162, 182

[56] References Cited

U.S. PATENT DOCUMENTS 3,628,965  12/1971  Nijkerk .................................. 99/474

Primary Examiner—Philip R. Coe
Assistant Examiner—Timothy F. Simone
Attorney, Agent, or Firm—Diller, Ramik & Wight

[57] ABSTRACT

A device for treating a mixture for the manufacture of chocolate, said device comprising a cyclic course of a milling vessel and a mixing vessel each having a driving motor for driving the milling members and the mixing members respectively and means connected with the cycle for supplying the mixture to be treated and means for the delivery of the ready product provided with means for adding to the cycle a viscosity-reducing agent.

9 Claims, 2 Drawing Figures

DEVICE FOR PREPARING CHOCOLATE

This application is a continuation of application Ser. No. 91,000, filed Nov. 5, 1979.

The invention relates to a device for treating a mixture for the production of chocolate, said device comprising a cycle including a milling vessel and a mixing vessel, each having a driving motor for driving the milling members and mixing members respectively, and means connected with said cycle for the supply of the mixture to be treated and means for delivering the ready product. Such a device is known from Dutch patent application No. 69.01227.

In this so-called "Wiener"-process the mixture to be treated is constantly circulated through the cyclic system and subjected to milling and mixing operations.

Irrespective of the ratios between the constituents chocolate always contains sugar, milk powder, cocoa powder and cocoa butter. Dependent upon the desired kind of chocolate substances are added such as glucose, vanilla, flavourings, dried fruit and candied rind. Among these substances cocoa butter is for the major part determinative of the taste. However, it is the most expensive of the ingredients. Therefore, the manufacturer tends to minimize the amount of cocoa butter. A limiting factor is, however, the required taste. A further limiting factor is the workability. If the amount of cocoa butter is comparatively small, the mixture will be tough and can be stirred only with difficulty. The ratio between the constituents of the mixture is the manufacturer's trade secret. It is, however, very likely for a given, desired taste to be obtained by a minor amount of cocoa butter, but the mixture may then become unworkable. The invention has for its object to provide a solution for this problem. In the device according to the invention this is achieved by means of supplying a viscosity reducing agent to the cycle. It is thus possible, if desired, to add a given amount of viscosity-reducing agent in order to enhance the stirring effect, whilst the amount of expensive cocoa butter may be kept low. The means for supplying the viscosity-reducing agent may be formed by a dosing device connected with a supply vessel. The dosing device may be actuated when it is assessed by a monitoring member that the workability has dropped below a given level. The viscosity-monitoring member may be the driving motor of the mixing vessel or the milling vessel.

When the toughness of the mixture increases the driving motor will reduce its speed and consume more current from the supply mains. It is therefore possible to control the dosing device by means of a member measuring the current passing through the motor. Since the recipe of the chocolate is a trade secret, the toughness of the mixture at which the viscosity-reducing agent has to be added must be selectable. This is achieved by connecting an adjustable resistance between the member measuring the motor current and the dosing device. Thus one manufacturer may add an amount of viscosity-reducing agent at a given toughness of the mixture and hence at a given ratio between the cocoa butter and the further ingredients, whereas a further manufacturer may select a different degree of toughness.

The dosing device may be formed by a pump. The viscosity reducing agent may be lecithin.

The invention will be described more fully with reference to the drawings.

Figure 1:
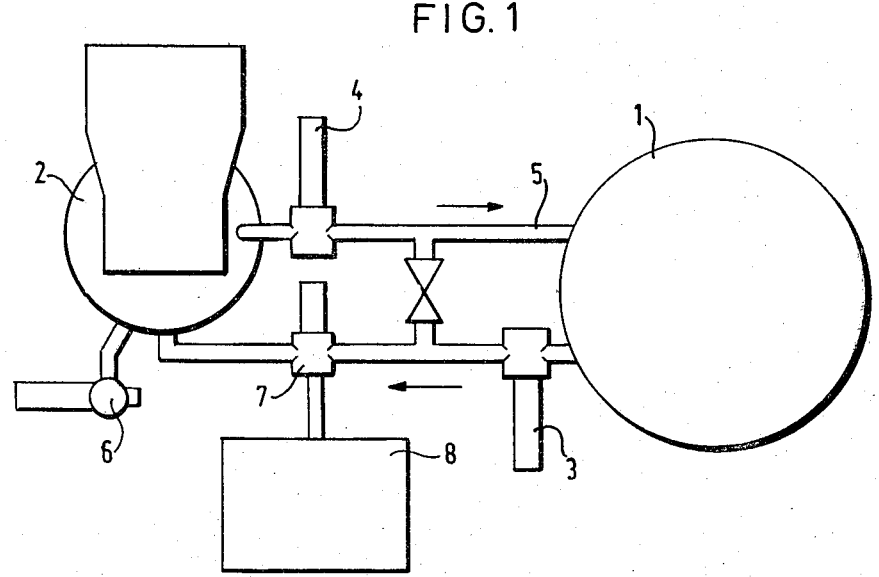
FIG. 1 shows schematically the device in accordance with the invention.

The device according to the invention comprises a mixing vessel 1, a milling vessel 2, connecting ducts between the two vessels, a positive displacement pump 3 for transporting the material from the mixing vessel 1 to the milling vessel 2 and a positive displacer pump 4 for transporting the material from the milling 2 to the mixing vessel 1. There are furthermore provided means 5 for the supply of the mixture to be worked and means 6 for the delivery of the ready product.

According to the invention the cyclic course includes a dosing pump 7, which can add the viscosity-reducing agent to the cycle from a supply vessel 8.

Figure 2:
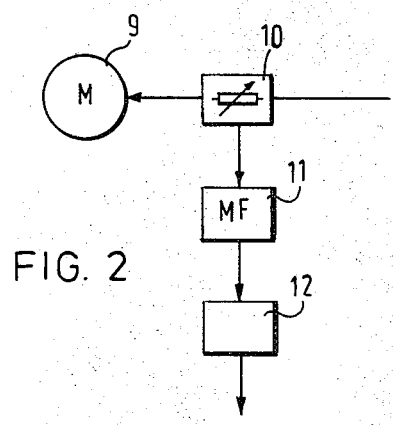
FIG. 2 illustrates a circuit-arrangement suitable for use in the device shown in FIG. 1.

FIG. 2 shows schematically a potential embodiment for the control of the dosing pump 7. The current circuit for the motor 9 includes a variable resistance 10. Across the variable part of the resistor 10 is produced a voltage, the value of which depends upon the motor current. This voltage is applied to a monostable multivibrator 11. When the adjustable threshold is exceeded, the monostable multivibrator is triggered and will remain in the on-position for a given period of time, for example, 10 seconds. During this period the monostable multivibrator 11 applies a signal to the energizing circuit 12 of the dosing pump 7, which is thus actuated. At the termination of the period of time determined by the monostable multivibrator 11 the pump stops operating. Thus a fixed amount of viscosity-reducing agent determined by the fluid displacement of the pump 7 is fed from the feedstock 8 to the cyclic course. The contents of the supply vessel 8 are chosen so that the amount of viscosity-reducing agent contained therein as compared with the contents of the milling vessel 2 will never exceed the limit fixed by the authorities. For lecithin said limit is 0.4% by weight.

What I claim is:

1. A device for batch treatment of ingredients for the manufacture of chocolate, which comprises the combination of:

milling means for grinding a quantity of the ingredients and mixing means for mixing the ground ingredients, first means for continuously circulating the ingredients from said milling means to said mixing means and second means for continuously circulating said ingredients back to said milling means from said mixing means whereby to form a closed recirculating system in which the viscosity of the ingredients tends to rise incidental to the milling and mixing thereof during each cycle of circulation; and dosing means for introducing a predetermined small amount of viscosity reducing agent other than cocoa butter into the circulating ingredients only when the viscosity of the ingredients exceeds a selectable threshold value.

2. A device as defined in claim 1 including selecting means for adjusting the value of the threshold at which said dosing means operates.

3. A device as defined in claim 1 or 2 wherein said dosing means comprises a supply of the viscosity reducing agent and a pump for delivering viscosity reducing agent from said supply to the ingredients returning to said milling means.

4. A device as defined in claim 3 wherein said dosing means includes circuitry for operating said pump only in response to said threshold value.

5. A device as defined in claim 4 wherein said circuitry includes a pulse generator for pulsing said pump.

6. A device as defined in claim 2 wherein said dosing means comprises a supply of the viscosity reducing agent and a pump for delivering viscosity reducing agent from said supply to the ingredients returning to said milling means, each said milling means and said mixing means including a drive motor, said selecting means comprising a member measuring the current drawn by one of such drive motors.

7. A device as defined in claim 6 wherein said dosing means includes circuitry for operating said pump only in response to said threshold value.

8. A device as defined in claim 7 wherein said circuitry includes a pulse generator for pulsing said pump.

9. A device for batch treatment of ingredients for the manufacture of chocolate, which comprises the combination of:

milling means for grinding a quantity of the ingredients and mixing means for mixing the ground ingredients, first means for continuously circulating the ingredients from said milling means to said mixing means and second means for continuously circulating said ingredients back to said milling means from said mixing means whereby to form a closed recirculating system in which the viscosity of the ingredients tends to rise incidental to the milling and mixing thereof during each cycle of circulation;

a reservoir containing a fixed quantity of a viscosity reducing agent other than cocoa butter;

means for producing an output signal whose amplitude increases as the power consumed either by said mixing means or said milling means increases;

dosing means for introducing a viscosity reducing agent other than cocoa butter into the circulating ingredients; and means responsive only to a value of said output signal exceeding a predetermined value for actuating said dosing means.

* * * * *